(12) United States Patent
Mizukami et al.

(10) Patent No.: US 9,641,743 B2
(45) Date of Patent: May 2, 2017

(54) SYSTEM, METHOD, AND APPARATUS FOR CONTROLLING TIMER OPERATIONS OF A CAMERA

(71) Applicant: SONY CORPORATION, Tokyo (JP)

(72) Inventors: Tomoo Mizukami, Tokyo (JP); Ryoko Amano, Tokyo (JP); Daichi Yagi, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/640,476

(22) Filed: Mar. 6, 2015

(65) Prior Publication Data

US 2016/0261788 A1   Sep. 8, 2016

(51) Int. Cl.
*H04N 5/232* (2006.01)
*G03B 17/40* (2006.01)
*G06F 3/0488* (2013.01)
*G06F 3/0484* (2013.01)

(52) U.S. Cl.
CPC ......... *H04N 5/23216* (2013.01); *G03B 17/40* (2013.01); *G06F 3/04847* (2013.01); *G06F 3/04883* (2013.01); *H04N 5/23293* (2013.01)

(58) Field of Classification Search
CPC ............ H04N 5/23216; H04N 5/23293; G06F 3/04883
USPC .................................................... 348/333.02
See application file for complete search history.

(56) References Cited

U.S. PATENT DOCUMENTS

| | | | |
|---|---|---|---|
| 2009/0040215 A1* | 2/2009 | Afzulpurkar | G06K 9/00355 345/419 |
| 2010/0020221 A1 | 1/2010 | Tupman et al. | |
| 2010/0253842 A1* | 10/2010 | Huang | H04N 5/77 348/552 |
| 2011/0267530 A1* | 11/2011 | Chun | G06F 3/04883 348/333.11 |
| 2013/0155255 A1 | 6/2013 | Yu | |
| 2013/0278808 A1* | 10/2013 | Tokairin | G06F 3/041 348/333.01 |

(Continued)

FOREIGN PATENT DOCUMENTS

| | | |
|---|---|---|
| JP | 2004-64226 | 2/2004 |
| JP | 2005-70392 | 3/2005 |
| JP | 2005-236553 | 9/2005 |

OTHER PUBLICATIONS

Extended European Search Report issued Jun. 27, 2016 in Patent Application No. 15160183.8.

(Continued)

*Primary Examiner* — Nhan T Tran
*Assistant Examiner* — Chan Nguyen
(74) *Attorney, Agent, or Firm* — Oblon, McClelland, Maier & Neustadt, L.L.P.

(57) ABSTRACT

A device includes circuitry configured to acquire detection signals from at least one sensor device corresponding to an input operation and determine one or more input characters based on one or more characteristics of the detection signals. The circuitry is also configured to activate a timer corresponding to the one or more input characters and issue a control signal to at least one camera to perform an image capture operation when an amount of remaining time on the timer is equal to zero.

18 Claims, 7 Drawing Sheets

(56) References Cited

U.S. PATENT DOCUMENTS

| | | | | |
|---|---|---|---|---|
| 2014/0049652 A1* | 2/2014 | Moon | H04N 9/8233 | 348/207.1 |
| 2014/0240540 A1* | 8/2014 | Kim | H04N 5/2258 | 348/231.99 |
| 2014/0344768 A1* | 11/2014 | Su | G06F 3/04883 | 715/863 |
| 2014/0359541 A1* | 12/2014 | Park | G06F 3/0488 | 715/863 |
| 2015/0109221 A1* | 4/2015 | Wang | G06F 3/0488 | 345/173 |

OTHER PUBLICATIONS

Masashi Tanimura, et al., "Smartphone User Interface", http://www.fujitsu.com/global/documents/about/resources/publications/fstj/archives/vol49-2/paper14.pdf, vol. 49, No. 2, Apr. 2013, pp. 227-230.

\* cited by examiner

SYSTEM, METHOD, AND APPARATUS FOR CONTROLLING TIMER OPERATIONS OF A CAMERA

BACKGROUND

Technical Field

The present disclosure relates to control of image capture operations for a camera via a self-timer.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Terminal devices such as smart phones and tablets often include at least one camera that is operated via a touchscreen on the terminal devices. The cameras on the terminal devices can be mounted so that a user can take a picture of himself or herself (referred to as a "selfie") while controlling operation of the camera via the touchscreen. In addition, the terminal devices often include self-timer functionality, which causes the shutter of the camera operate in order to take a picture after a predetermined number of seconds have passed. In conventional self-timer functions, the user selects the self-timer mode from a menu of camera settings and/or functions and inputs a number of seconds until an image capture operation is to occur, which can be a cumbersome process that decreases the convenience of using the self-timer function for the cameras.

SUMMARY

In an exemplary embodiment, a device includes circuitry configured to acquire detection signals from at least one sensor device corresponding to an input operation and determine one or more input characters based on one or more characteristics of the detection signals. The circuitry is also configured to activate a timer corresponding to the one or more input characters and issue a control signal to at least one camera to perform an image capture operation when an amount of remaining time on the timer is equal to zero.

In another exemplary embodiment, a method of controlling operation of a camera on a device includes acquiring detection signals from at least one sensor device corresponding to an input operation; determining one or more input characters based on one or more characteristics of the detection signals; activating a timer corresponding to the one or more input characters; and issuing a control signal to at least one camera to perform an image capture operation when an amount of remaining time on the timer is equal to zero.

In another exemplary embodiment, a non-transitory computer readable medium having instructions stored therein that, when executed by one or more processors, cause the one or more processors to perform a method of controlling operation of a device, wherein the device includes a camera, the method including: acquiring detection signals from at least one sensor device corresponding to an input operation; determining one or more input characters based on one or more characteristics of the detection signals; activating a timer corresponding to the one or more input characters; and issuing a control signal to at least one camera to perform an image capture operation when an amount of remaining time on the timer is equal to zero.

The foregoing general description of exemplary implementations and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
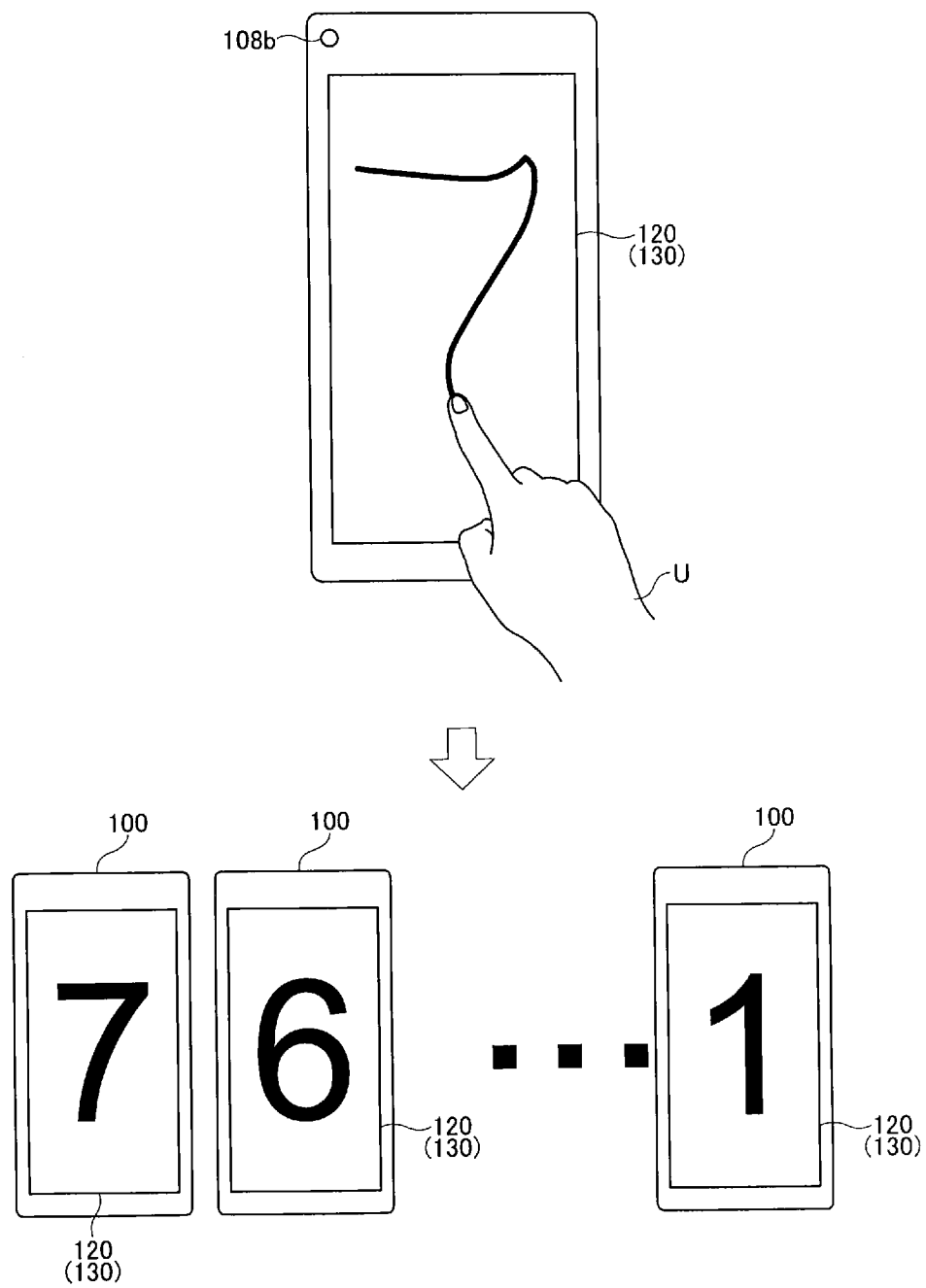
FIG. 1 is an exemplary illustration of camera control operations on a terminal device, according to certain embodiments.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "about," and similar terms generally refer to ranges that include the identified value within a margin of 20%, 10%, or preferably 5%, and any values therebetween.

This disclosure relates to a method of operating a terminal device to control camera operations. For the remainder of this description, the phrase "terminal device" is meant to describe any sort of electronic device with or without a touchscreen display and wireless communication capability that can be worn by a user, such as a smart phone, tablet, smart watch, and the like. This phrase is not meant to limit the scope of this disclosure, but is used to merely provide a more concise description.

FIG. 1 is an exemplary illustration of camera control operations on a terminal device 100, according to certain embodiments. The terminal device 100 includes a first camera 108a (not shown) and a second camera 108b mounted on opposite sides of the terminal device 100. In some implementations, the second camera 108b is located on the same side of the terminal device 100 as the touchscreen 130 and the display 120 and is used to perform self-photography of a user U. Details regarding the first camera 108*a* and second camera 108*b* are discussed further herein. The terminal device 100 also includes a display 120 and touchscreen 130.

When the user U moves a finger on a surface of the touchscreen 130, and a shape of symbol, such as an Arabic number, is drawn, the processing circuitry of the terminal device 100 recognizes the number and displays the number as an initial timer value on the display 120, and a self-timer on the terminal device 100 counts down from the initial timer value. For example, when the user U draws an input number of "7" on the touchscreen 130, the initial timer value of "7" is output on the display 120, and the terminal device 100 counts down from 7, to 6, and all the way down to 1. In some implementations, when the timer value reaches zero, pixels on an image pick-up device, such as a charged coupled device (CCD) chip set, capture photon energy and perform photoelectrical conversions to produce electrical signals based on the captured photon energy, which is referred to as an image capture operation.

Figure 2:
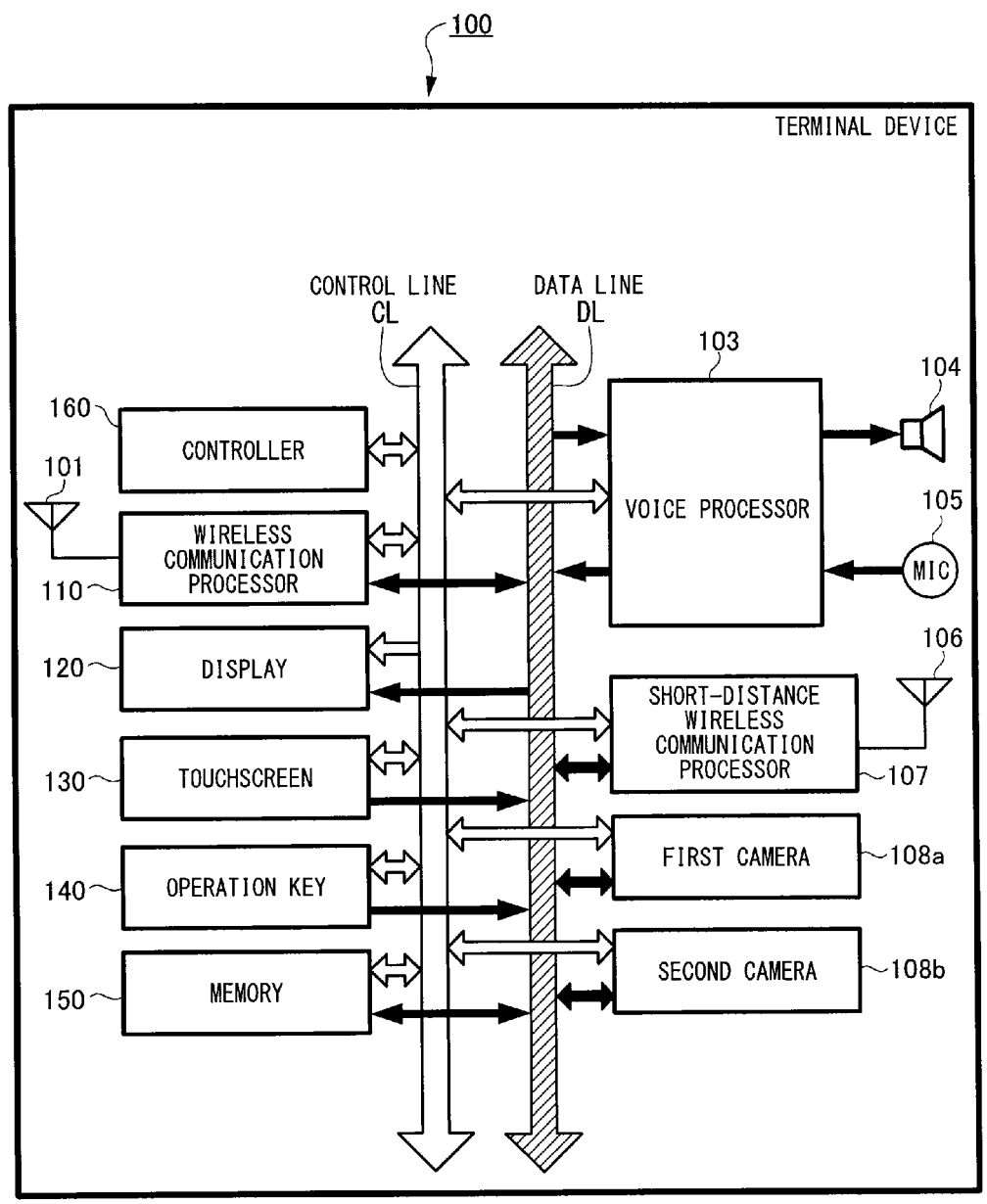
FIG. 2 illustrates a non-limiting example of a block diagram for a terminal device, according to certain embodiments.

FIG. 2 illustrates a non-limiting example of a block diagram for a terminal device 100, according to certain embodiments. The block diagram of the terminal device 100 includes sensors and processing circuitry for control of camera operations. The terminal device 100 is equipped with an antenna 101 for wirelessly communicating with cell towers. The antenna 101 is connected to the wireless communication processor 110. The wireless communication processor 110 performs the processes of transmitting and receiving radio signals under the control of the controller 160. The controller 160 may include one or more Central Processing Units (CPUs), and may control each element in the terminal device 100 to perform features related to communication control, audio signal processing, control for the audio signal processing, control for display 120 processing, motion sensor processing, and other types of processing. The controller 160 may perform these functions by executing instructions stored in a memory 150. The terminal device can also include a card slot to hold a memory card with increased storage capacity. Alternatively or in addition to the local storage of the memory 150, the features may be executed using instructions stored on an external device accessed on a network, or on a non-transitory computer readable medium.

According to certain embodiments, the controller 160 determines the shape, direction, and/or trajectory of movement of a finger of the user across the touchscreen 130 based on detection signals output by the touchscreen 130. Terminal device operations, such as display operations, video recording, and the like, are controlled based on the detection result. In addition, the controller 160 processes images and generates image data based on stored instructions for one or more applications on the terminal device 100. The image data can also be output to the display 120 for viewing by the user U. In some embodiments, the display 120 can have an exclusive controller for generating image data.

The storage of data in the memory 150 and read-out of data from memory 150 are performed under the control of the controller 160. The terminal device 100 includes a control line CL and data line DL as internal communication bus lines. Control data to/from the controller 160 may be transmitted through the control line CL. The data line DL may be used for transmission of voice data, display data, etc.

Voice data received by the wireless communication processor 110 is sent to the voice processor 103 through the data line DL. The voice processor 103 demodulates the voice data and obtains an analog voice signal. The analog voice signal is supplied to a speaker 104, and the speaker 104 outputs a sound corresponding to the analog voice signal. In addition, the voice processor 103 converts a voice signal from a microphone 105 to voice data that is supplied to the wireless communication processor 110 through the data line DL. The voice data that is sent to the wireless communication processor 110 is then converted to packets for radio transmission. If the terminal device 100 is not equipped with a voice call function, the voice processor 103, speaker 104, and microphone 105 may be omitted.

When the terminal device 100 is conducting data communication which may include the transmission or reception of electronic mail via a network, such as the internet, the wireless communication processor 110 transmits or receives the data under the control of the controller 160. In certain embodiments, the data received by the wireless communication processor 110 are stored in the memory 150, and the controller 160 is responsible for controlling the process of displaying the data that is stored in the memory 150. In addition, data stored in the memory 150 may be sent to the wireless communication processor 110 in order to be radio-transmitted. When the user desires to discard data such as unwanted electronic mail, the controller 160 erases the data stored in the memory 150.

The terminal device 100 includes a display 120 that displays still and moving image data via the controller 160. The display 120 may also display operational inputs such as numbers or icons, which may be used for control of the terminal device 100. The display 120 may additionally display a graphical user interface such that the user may control aspects of the terminal device 100 and/or other devices. In certain embodiments, the controller 160 may control the display 120 to display a home screen interface, the most recent interface, or another interface of the terminal device 100. Further, the display 120 may display characters and images received by the terminal device 100 and/or stored in the memory 150 or accessed from an external device on a network. For example, the terminal device 100 may access a network such as the Internet, and display text and/or images transmitted from a Web server.

The display screen of the display 120 may be a Liquid Crystal Display (LCD) screen, an organic electroluminescence display panel, or another display screen technology. The backlight illuminates the back surface of the display screen by an edge-lit system, a direct-lit system, and the like. The light source for the backlight may be Light Emitting Diodes (LED), Cold-Cathode Fluorescent Lamps (CCFL), and the like.

The terminal device 100 is also equipped with a touchscreen 130, which is a sensor device that is able to detect when an object such as a finger or a pen touches the display screen. Used herein, the phrase "touch operation" refers to an input operation performed by touching an operational surface of the touchscreen 130 with an instruction object, such as a finger, pen, or stylus-type instrument. In certain aspects of the present disclosure, the touchscreen 130 may be disposed adjacent to the display 120 (e.g., laminated), or may be formed integrally with the display 120. For simplicity, the present disclosure assumes the touchscreen 130 is formed integrally with the display 120 and therefore, examples discussed herein may describe touch operations being performed on the surface of the display 120 rather than the touchscreen 130. However, the skilled artisan will appreciate that this is not limiting.

For simplicity, the present disclosure assumes the touchscreen 130 is an electrostatic capacitance-type touch panel technology; however, it should be appreciated that aspects of the present disclosure may easily be applied to other touch panel types (e.g., resistance type touch panels) with alternate structures. In the case of an electrostatic-capacitance touch panel display, when conductors, such as a finger or stylus, approach or contact the touchscreen 130, the electrodes of the touchscreen 130 may detect and measure electrostatic capacitance changes, and features of the touch operation may be determined based on the detections/measurements.

In certain aspects of the present disclosure, the touchscreen 130 may include transparent electrode touch sensors arranged in the X-Y direction on the surface of transparent sensor glass. In this aspect, the X-axis is a horizontal axis, and the Y-axis is a vertical axis, which are orthogonally crossed. In certain embodiments, the data regarding the position on the X-Y axis that the touch operation occurred is transmitted to the controller 160, which then activates an application based on the touch position. In addition, if more than one touch operation occurs simultaneously in different positions on the display 120, the controller 160 may detect that one or more areas of the display 120 have been touched or that a wide area of the display 120, which may include the entire display 120, has been touched.

Next, an operation key 140 may include one or more buttons or similar external control elements, which may generate an operation signal based on a detected input from a user. In addition to outputs from the touchscreen 130, these operation signals may be supplied to the controller 160 for performing related processing and control. In certain aspects of the present disclosure, the processing and/or functions associated with external buttons and the like may be performed by the controller 160 in response to an input operation on the touch panel display screen rather than the external button, key, etc. In this way, external buttons on the terminal device 100 may be eliminated in lieu of performing inputs via touch operations, thereby improving water-tightness.

Next, a short distance wireless communication processor 107 is configured to communicate wirelessly with external devices, e.g., via a wireless protocol such as Bluetooth, Near Field Communication (NFC), Wi-Fi, 802.11, etc. This short distance wireless communication processor 107 enables the terminal device 100 to wirelessly communicate via an antenna 106 with other devices within the range of approximately tens of meters.

The terminal device 100 is equipped with the first camera 108a and the second camera 108b. The first camera 108a is on an outer surface of the terminal device 100 that is opposite the touchscreen 130 and display 120, and the second camera 108b is on an inner surface of the terminal device 100 that is on the same side as the touchscreen 130 and display 120. The first camera 108a and second camera 108b include optical systems having at least one optical lens that guides light to an image pick-up device, such as a charged coupled device (CCD) chip set. The image pick-up device includes pixels that capture photon energy and perform photoelectrical conversions to produce electrical signals based on the captured photon energy. The first camera 108a and second camera 108b also include a signal processor which processes the electrical signals produced by the image pick-up device and outputs an image signal. The image signal output from the signal processor is stored by the memory 150 as image data and is controlled by the controller 160.

The terminal device 100 is also equipped with a power supply such as a battery that supplies electric power to each part of the terminal device 100.

Figure 3:
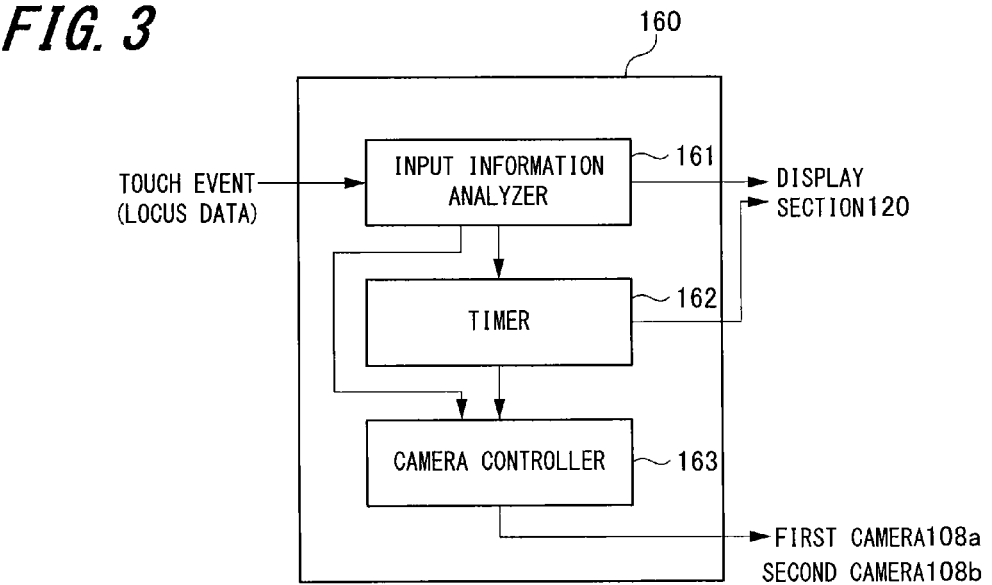
FIG. 3 is an exemplary functional illustration of a controller in a terminal device, according to certain embodiments.

FIG. 3 is an exemplary functional illustration of a controller 160 in a terminal device 100, according to certain embodiments. For example, processing circuitry of the controller 160 executes one or more software processes to perform functions of an input information analyzer 161, a timer 162, and a camera controller 163. When performing the input information analyzer 161 functions, the processing circuitry analyzes the input information input by the user by determining the characteristics of finger strokes made on the surface of the touchscreen 130. For example, the processing circuitry determines the shape, direction, and/or trajectory of movement of a finger of the user across the touchscreen 130 based on detection signals output by the touchscreen 130. When the input information is a number, the input information analyzer 161 outputs the value of the number to the display 120 and the timer 162. If the input information is not a number, the input information analyzer 161, outputs an analysis result to the camera controller 163 as necessary. In some implementations, the input information analyzer 161 is a standalone recognition processing module that is separate from the controller 160.

The timer 162 determines an amount of time remaining (timer value) based on the number determined by the input information analyzer 161 and starts a countdown, referred to as a timer operation, from the timer value. The remaining time in the countdown is output to the display 120. According to certain embodiments, the timer 162 can also be activated without outputting the remaining time to the display 120. When the remaining time reaches zero, the timer 162 outputs a signal to the camera controller 163. In some implementations, the timer 162 measures time using a clock of a processor of the terminal device 100. In addition, the timer 162 may be separate from the controller 160 according to some aspects.

The camera controller 163 function controls operation of the first camera 108a and the second camera 108b based on the analysis result determined by the input information analyzer 161. When the camera controller 163 receives a signal from the timer 162 indicating that the remaining time is equal to zero, the camera controller 163 outputs a control signal to the first camera 108a and/or the second camera 108b to perform an image capture operation.

Figure 4:
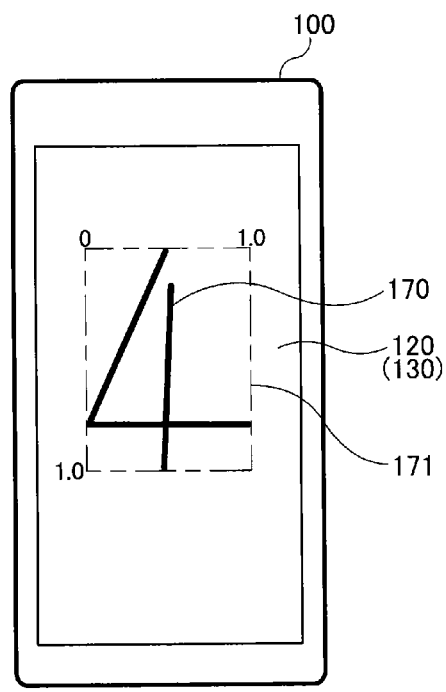
FIG. 4 is an exemplary illustration of number recognition operations for a terminal device, according to certain embodiments.

FIG. 4 is an exemplary illustration of number recognition operations for a terminal device 100, according to certain embodiments. When a touch operation is performed by a finger on the touchscreen 130, recognition of the number or character traced by the finger on the touchscreen 130 is performed by the input information analyzer 161. When the camera function is enabled on the terminal device 100, touch operations performed by the user are saved in the memory 150 as input information. According to certain embodiments, when the camera function is enabled, the display 120 shows a preview screen for the camera that corresponds to a field of view of a camera lens.

In some implementations, finger strokes made by a finger on the surface of the touchscreen 130 are referred to as touch-move events. Details regarding touch-move events are discussed further herein. When the finger leaves the touchscreen 130, the input information analyzer 161 analyzes the data based on the shape, direction, and/or trajectory of movement of the finger across the touchscreen 130 and determines the character, such as a number, drawn by the finger on the touchscreen 130. The finger strokes made on the surface of the touchscreen 130 can be shown on the display 120 as the finger moves across the touchscreen. In other embodiments, the finger strokes are not shown on the display 120.

In some implementations, the determination of the character drawn by a finger on the touchscreen 130 does not depend on the size of the display 120, orientation of the terminal device 100, and the like. For example, processing circuitry of the input information analyzer 161 does not depend on coordinates of the touchscreen 130 to determine the character drawn by a finger on the touchscreen 130.

As shown in FIG. 4, the processing circuitry of the input information analyzer 161 establishes a circumscription rectangle 171 within which a finger stroke trajectory 170 is determined. The circumscription rectangle 171 is calculated based on a minimum and maximum value in the horizontal and vertical directions from a reference coordinate, such as an upper left corner of the touchscreen 130. The input information analyzer 161 records and normalizes relative coordinates of each point in the finger stroke trajectory 170 based on a relative location within the circumscription rectangle 171. In the example illustrated by FIG. 4, the relative coordinates of 0 to 1.0 are allocated to the horizontal and vertical dimensions of the circumscription rectangle 171, and the shape of the finger stroke trajectory 170 is based on the relative coordinates.

In some implementations, when the self-timer function of the first camera 108a or second camera 108b is employed, a number or character drawn with a finger on the touchscreen 130 may require a two-stroke operation where the user lifts the finger from the touchscreen 130 in between strokes, which can be referred to as a touch-up event. The input information analyzer 161 determines whether a second stroke has commenced within a predetermined time after the finger leaves the touchscreen 130 after a first stroke and a number has not been recognized. If the second stroke commences within the predetermined period of time, the input information analyzer 161 evaluates the input information based on trajectory data for the first stroke and second stroke when the finger leaves the touchscreen 130 after completing the second stroke.

The input information analyzer can also determine double-digit numbers that have been drawn on the touchscreen 130 of the terminal device 100. For example, if a number is drawn on a left side of the circumscription rectangle 171, the processing circuitry of the input information analyzer 161 may determine that double digits are being drawn. The processing circuitry may also determine that double digits are being drawn if a "1" is input as the first stroke. In addition, numbers or characters having three or more strokes may also be recognized by the processing circuitry of the input information analyzer 161.

In certain embodiments, the camera function of the terminal device 100 employs a touch focus operation where focus points for the cameras are determined via the touchscreen 130 interface. The processing circuitry of the input information analyzer 161 differentiates between touch focus operations and self-timer finger stroke operations based on the length of the touch operations on the touchscreen 130. For example, when a camera preview screen is shown on the display 120 and touch focus operations are in effect, if a finger remains on the touchscreen 130 greater than a predetermined amount of time, the processing circuitry of the input information analyzer 161 determines that a number is being drawn, and the self-timer function is activated.

Figure 5:
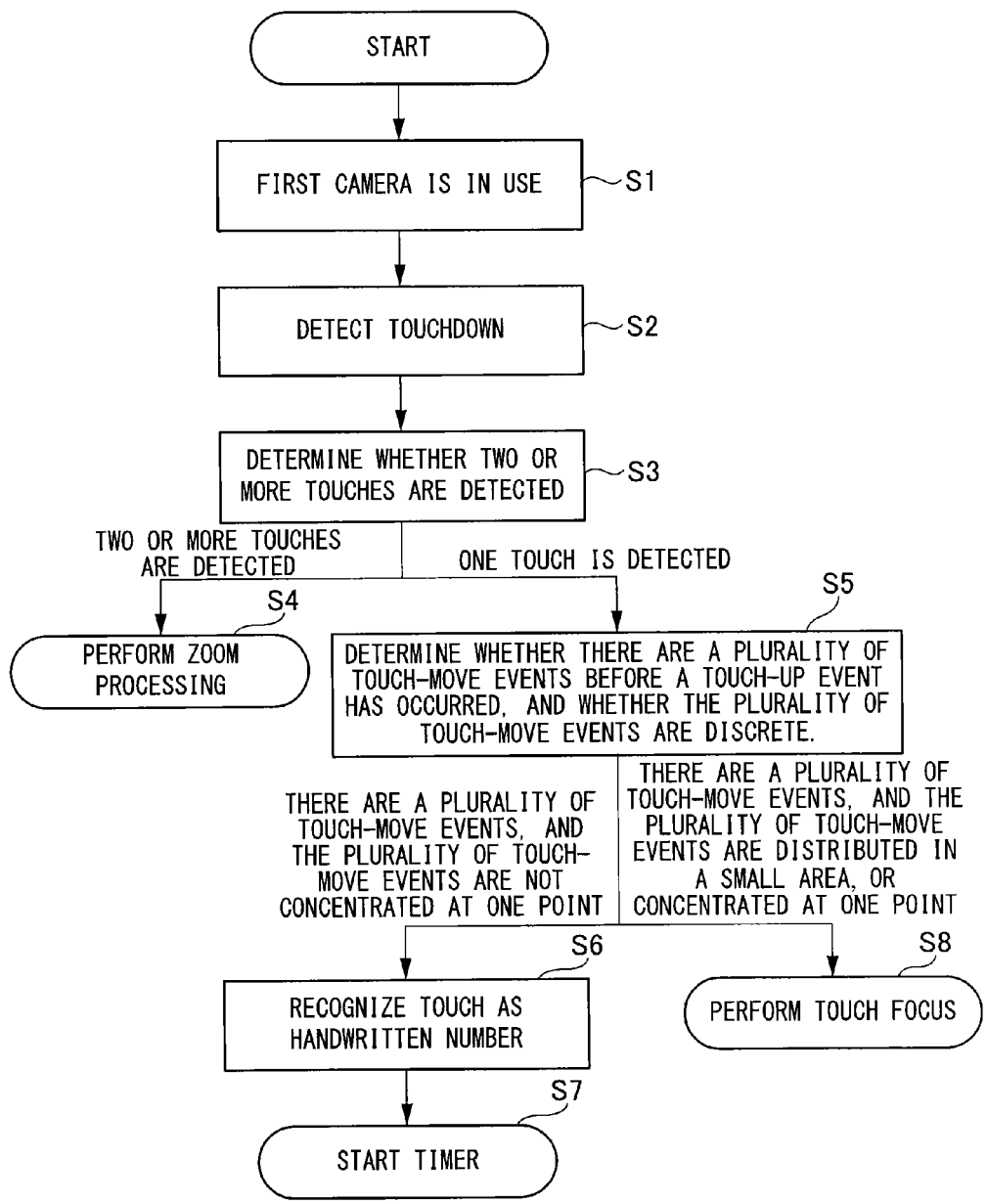
FIG. 5 is an exemplary flowchart of a timer initialization process, according to certain embodiments.

FIG. 5 is an exemplary flowchart of a timer initialization process, according to certain embodiments. The timer initialization process can be initialized when a preview screen for the first camera 108a or second camera 108b is displayed on the display 120. In addition, the timer initialization process is described herein with respect to the first camera 108a, but the timer initialization process can also be employed when the second camera 108b is in use, such as when self-photography is performed.

At step S1, the processing circuitry of the controller 160 determines that the first camera 108a is in use based on the camera function for the terminal device 100 being turned on. At step S2, when a user places a finger on the surface of the touchscreen 130, the touchscreen 130 outputs a detection signal to the input information analyzer 161. The processing circuitry of the input information analyzer 161 analyzes the detection signal output from the touchscreen 130 and detects commencement of a touch operation.

At step S3, the processing circuitry of the input information analyzer 161 of the controller 160 determines whether two or more touches have been simultaneously detected on the touchscreen 130. For example, when a zoom function of the first camera 108a is employed, the user can simultaneously touch two fingers to the touchscreen 130 and move the fingers in a pinch-in or pinch-out motion to zoom the camera viewing field in and out. If the processing circuitry of the input information analyzer 161 determines that two or more touches have been simultaneously detected, then step S4 is performed. Otherwise, if one touch is detected by the processing circuitry of the input information analyzer 161, then step S5 is performed.

At step S4, when two or more touches are simultaneously detected on the touchscreen 130, the input information analyzer 161 outputs the detection result to the camera controller 163. The camera controller 163 outputs a control signal to the first camera 108a to perform a zoom function based on the trajectory of the two or more touches, such as a pinching in or pinching out of two fingers. By determining that two or more simultaneous touches relate to a zoom operation, the processing circuitry of the input information analyzer is able to differentiate between zoom operations on the touchscreen 130 and the input of a number for self-timer operations.

At step S5, when one touch is detected on the touchscreen 130 at step S3, the processing circuitry of the input information analyzer 161 determines whether a plurality of touch-move events have occurred before a touch-up event has occurred and whether the plurality of touch-move events are discrete. In some implementations, touch-move events are strokes made by a finger on the touchscreen 130 as the finger moves across the touchscreen 130. A touch-up event occurs when the finger on the touchscreen 130 is lifted from the surface of the touchscreen 130. If a plurality of touch-move events have occurred and the plurality of touch-move events are not concentrated at one point, then step S6 is performed. Otherwise, if a plurality of touch-move events have occurred and the plurality of touch-move events are distributed over a small area or concentrated at one point, then step S8 is performed.

At step S6, if the plurality of touch-move events are distributed across the touchscreen 130 and not concentrated at one point, the input information analyzer 161 processes the touch-move events to determine shape, direction, and/or trajectory of the finger strokes and determine the number or character drawn on the touchscreen 130.

At step S7, the processing circuitry of the input information analyzer 161 outputs the value of the number determined at step S6 to the timer 162. The timer 162 determines an amount of time remaining (timer value) based on the number determined by the input information analyzer 161 and starts a countdown, referred to as a timer operation, from the timer value. The remaining time in the countdown is output to the display 120. When the remaining time reaches zero, the timer 162 outputs a signal to the camera controller 163, and the camera controller 163 outputs a control signal to the first camera 108a to perform an image capture operation.

At step S8, if the plurality of touch-move events are distributed over a small area or concentrated at one point, the processing circuitry of the input information analyzer 161 outputs the detection result to the camera controller 163, and the camera controller 163 outputs a control signal to the first camera 108a to perform a touch focus operation. Touch focus operations can also be characterized by touch-move events lasting less than a predetermined length of time. In some implementations, a user attempting to perform a touch focus operation by tapping on the touchscreen may inadvertently perform a short swiping operation, which results in a plurality of touch-move events being recorded in memory 150. By determining that the touch-move events occurred over a small or concentrated area on the touchscreen 130, the processing circuitry of the input information analyzer 161 is able to differentiate between touch focus operations and the input of a number for self-timer operations.

Figure 6:
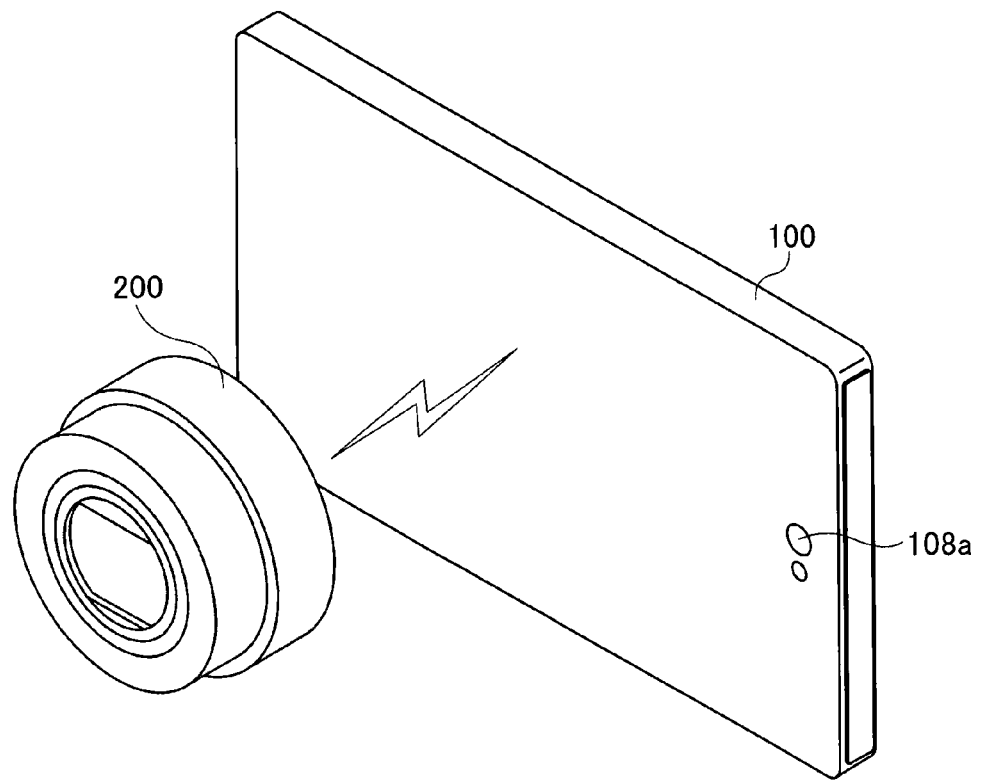
FIG. 6 is an exemplary illustration of a perspective view of a lens camera and terminal device, according to certain embodiments.

FIG. 6 is an exemplary illustration of a perspective view of a lens camera 200 and terminal device 100, according to certain embodiments. The lens camera 200 is a camera that connects to the terminal device 100, such as a smart phone, and wirelessly communicates with the terminal device 100 via WI-FI and/or Near Field Communication (NFC). In some implementations, the lens camera 200 is shaped like a barrel lens, such as the LENS-STYLE CAMERA by SONY, and also includes the image pick-up device. The lens camera uses the display 120 of the terminal device 100 as a preview screen, and a view finder or monitor may not be included as part of the lens camera 200. The lens camera exchanges image data with the terminal device 100 via a wireless connection, and the processing circuitry in the terminal device 100 processes the image data from the lens camera 200. In addition, the lens camera can be connected to an outer surface of the terminal device on the same side as the first camera 100 via a clip or other type of attachment accessory. In other embodiments, other types of cameras that communicate wirelessly with the terminal device 100 can also incorporate the self-timer function of the terminal device 100.

Figure 7:
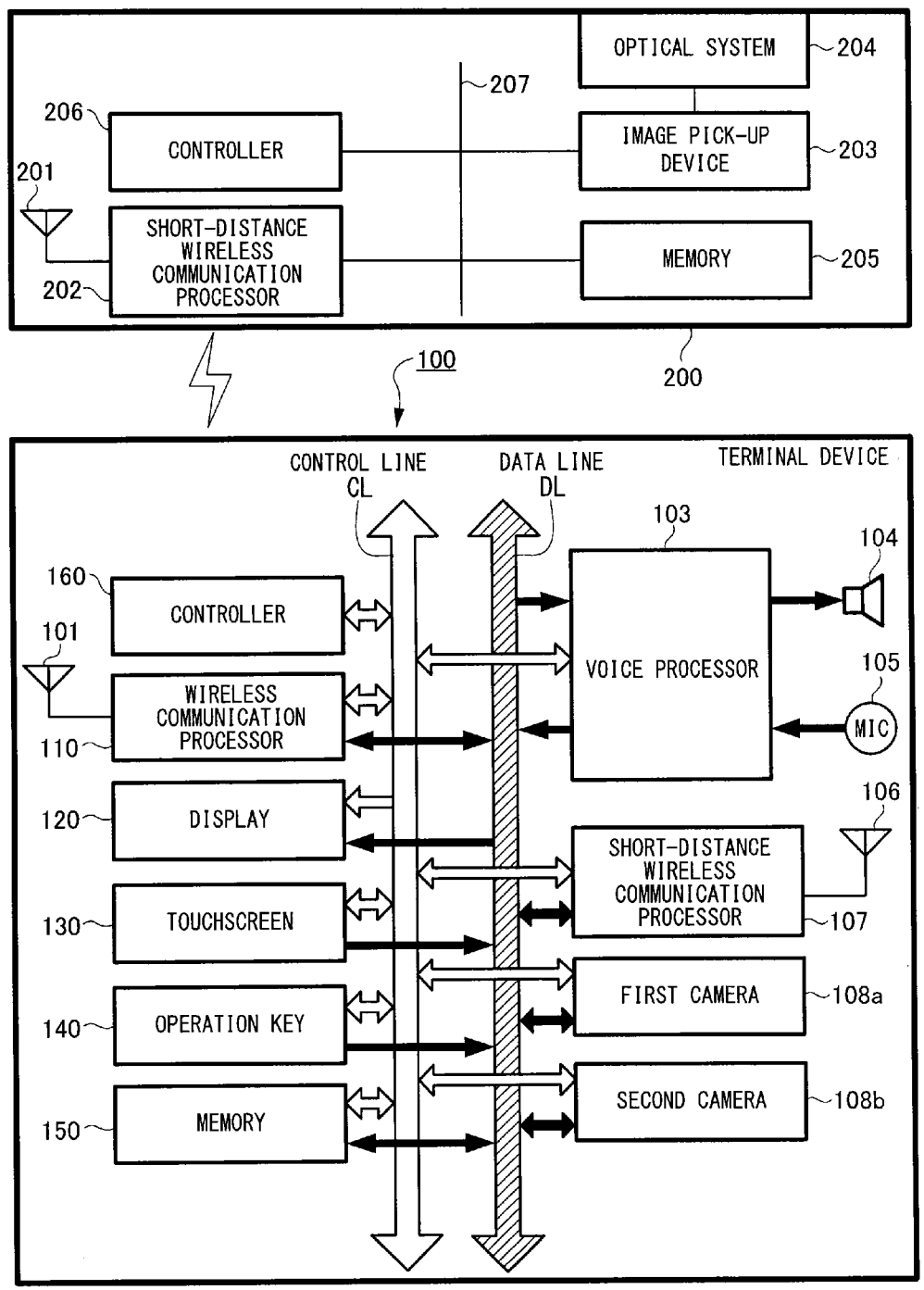
FIG. 7 illustrates a non-limiting example of a block diagram for a lens camera and terminal device, according to certain embodiments.

FIG. 7 illustrates a non-limiting example of a block diagram for a lens camera 200 and terminal device 100, according to certain embodiments. The terminal device 100 includes the components described previously with respect to FIG. 2. The lens camera 200 includes an antenna 201, a short-distance wireless communication processor 202, an image pick-up device 203, an optical system 204, and memory 205 which are connected to a controller 206 via bus 207. The short-distance wireless communication processor 202 and memory 205 can have the same functions and characteristics of the short-distance wireless communication processor 107 and memory 150 in the terminal device 100. In addition, the image pick-up device 203 and optical system 204 of the lens camera 200 have the functions and characteristics that correspond to the functions and characteristics of the optical system and image pick-up device in the first camera 108a and second camera 108b of the terminal device 100.

The lens camera 200 also includes a signal processor which processes the electrical signals produced by the image pick-up device 203 and outputs an image signal. The image signal output from the signal processor is stored as image data in the memory 205 and is transmitted to the terminal device 100 via the short distance wireless communication processor 202. The user can view the image obtained by the lens camera 200 on the display 120 of the terminal device 100 due to the wireless communications between the lens camera 200 and terminal device 100 and can also activate a self-timer function on the lens camera 200 by drawing a number on the surface of the touchscreen 130 of the terminal device 100.

Figure 8:
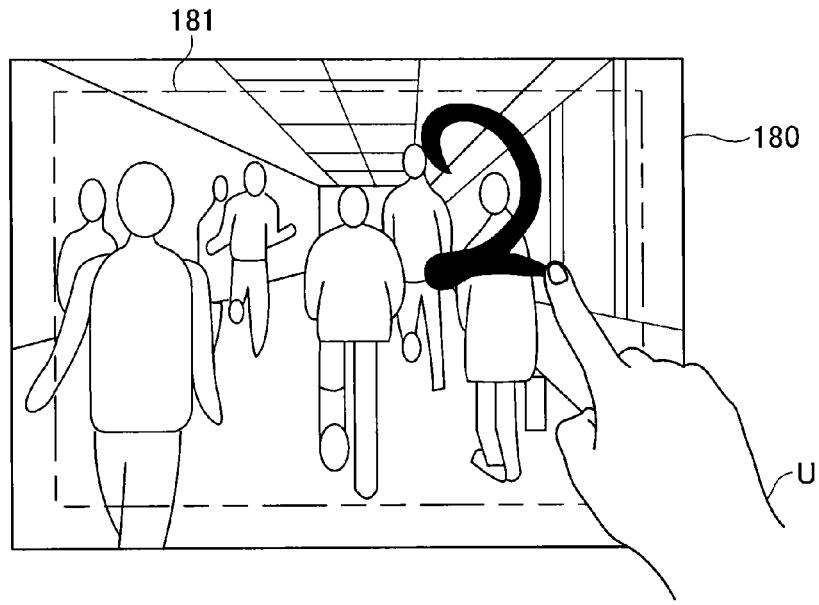
FIG. 8 is an exemplary illustration of a number being drawn in space, according to certain embodiments.

FIG. 8 is an exemplary illustration of a number being drawn in space, according to certain embodiments. The aspects of this disclosure directed to camera control operations can also be applied to a terminal device 100 without a touchscreen 130, such as a smart watch or other type of wearable terminal device. Wearable terminal devices can also include spectacles, goggles, headsets, earphones, necklaces, and like. In some implementations, the wearable terminal device has at least one camera embedded in the wearable terminal device. The wearable terminal device can function independently or communicate with another terminal device to assist with inputs and outputs to the wearable terminal device. In some implementations, the wearable terminal device is wirelessly connected to an action camera, which is a digital camcorder designed to record events in the outdoor or sporting environment and can be attached to a human body, bicycle, car, animal, surfboard, and the like.

In one implementation, in a scene 180 observed by a user, the image pick-up device of the first camera 108a captures a viewing area 181 that corresponds to an angle of the lens of the first camera 108a. The user can make a gesture within the viewing area 181 of the first camera 108a, and one or more still and/or video images of the gesture are obtained by the first camera 108a. The shape of the gesture is shown on the camera preview screen on the display 120 and stored in the memory 150.

For example, the user raises a finger and draws an Arabic numeral, such as the number "2" in the viewing area 181 of the first camera 108a. The one or more images of the gesture are stored in the memory 150, and the input information analyzer 161 determines the gesture from the one or more images using a known image recognition technique. In some implementations, the user performs a predetermined gesture to indicate that the beginning and end of the gesture. For example, the user can grasp a finger or make a first to hide the finger to indicate the beginning or end of the gesture.

In addition to drawing a number in space with a finger, the user can designate a number by holding up fingers of a hand within the viewing area 161. For example, holding up a finger with all five fingers extended can correspond to five seconds, and holding up a hand with three fingers extended can correspond to three fingers.

Figure 9:
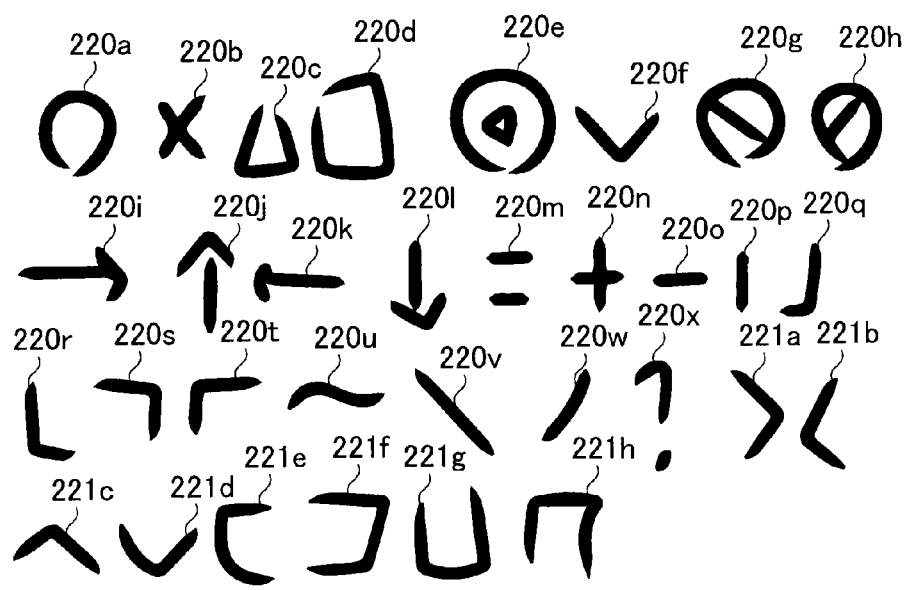
FIG. 9 is an exemplary illustration of symbols other than numbers, according to certain embodiments.

FIG. 9 is an exemplary illustration of symbols other than numbers that can be used in camera control operations, according to certain embodiments. Although numbers have been used to illustrate the use of the self-timer function for the first camera 108a and second camera 108b, other camera functions can be controlled via one-stroke or two-stroke symbols other than numbers. For example, zoom switching, ISO switching, scene mode switching, focus position, menu manipulation, auto-focus switching, augmented reality (AR) image processing effects, and the like, are other types of camera functions that can be controlled via finger strokes made on the touchscreen 130 of the terminal device 100. In certain embodiments, augmented reality is a general term for a technology that adds to, reduces, or changes the visual, hearing, or tactile perceptions of an environment by a user based on processes performed by a user. In addition, the finger strokes shown in FIG. 9 can be used for other functions of the terminal device 100 other than camera functions. Examples of one-stroke and two-stroke symbols include symbols 220a-220x and symbols 221a-221h.

In certain embodiments, symbols 220a, 220b, 220c, 220d, and 220e can be used to highlight one or more locations in the viewing field of the camera lens that is shown on the display 120. For example, the symbols 220a-220e can be used to indicate touch focus locations for the camera as well as locations for image editing, such as red eye reduction, image lighting changes, and the like. Symbols 220g and 220h can be drawn on the touchscreen 130 to activate a cropping function in an image editing mode of the terminal device 100. In addition, symbols 220p, 220q, 220r, 220s, and 220t can be drawn on the touchscreen 130 to indicate corners and boundaries during cropping operations. Symbols 220i, 220j, 220k, 220l, 221a, 221b, 221c, and 221d are exemplary arrow symbols that can be drawn on the touchscreen 130 to scroll between images stored in the memory 150, fast forward or rewind a video, and the like.

With regard to terminal device 100 functions other than camera functions, symbols 220m, 220n, 220o, 220u, 220v, and 220w can be drawn on the touchscreen 130 to indicate mathematical functions to be performed by a calculator application on the terminal device 100. Symbols 221e, 221f, 221g, and 221h can be drawn to highlight text, and symbol 220x can be drawn to activate a "help" function of the terminal device 100.

Other variations and modifications of the camera control operations and timer initialization process for the terminal device 100 can be applied in light of the above teachings. For example, the timer initialization process can commence when the terminal device 100 is in a sleep state, which is a power-saving state where the number of operating components in the terminal device 100 is reduced. If the user draws a number on the surface of the touchscreen 130 when the terminal device 100 is in the sleep state, the input information analyzer 161 recognizes the number, the sleep state is released, and the self-timer function for the camera is activated. In addition, when the input information analyzer 161 recognizes the number drawn on the touchscreen 130, the camera function and preview screen are also initialized.

In addition, the self-timer function for the camera can also be activated when the first camera 108a or second camera 108b on the terminal device 100 is operating but is not being used and the camera preview screen is not shown on the display 120. For example, if a user holds up a number of fingers or draws a number in space within the viewing area 181 when first camera 108a or second camera 108b is operating without the preview screen being displayed, the timer 162 will still be activated.

Operation of the self-timer can also be cancelled by user operation, according to certain embodiments. For example, the user can cancel operation of the self-timer by moving a finger across the surface of the touchscreen 130 in a horizontal direction, tapping the touchscreen 130, and the like. In addition, if the user draws a number on the touchscreen 130 while the timer 162 is counting down, the timer 162 can be reset and being re-counting down using the newly input number as the initial timer value.

The embodiments described herein can also be applied to functions of the terminal device 100 other than the camera control operations. For example, the drawing of finger strokes on the touchscreen 130 can also be applied to alarm functions and simple timer functions of the terminal device 100. In certain embodiments, the simple timer function refers to a timer function that is not tied to another function of the terminal device 100, such as the camera function. For example, when the timer 162 reaches zero, the terminal device 100 can output a sound, such as a ringtone, song, or spoken works, from the speaker 104. The terminal device 100 can also output a notification on the display 120 or emit a flashing light to indicate that the timer has reached zero. In some implementations, when a home screen is shown on the display 120 of the terminal device 100, the user can draw a number on the touchscreen 130 followed by the letter "C" to indicate that the camera self-timer function should be activated. When the number is input on the touchscreen 130 followed by the letter "T," the simple timer function may be activated.

Activating the camera self-timer function on the terminal device 100 by indicating a number of seconds through drawn numbers on the touchscreen 130 or gestures made in the viewing area 181 of the first camera 108a or second camera 108b can simplify actions taken by the user to activate the camera function on the terminal device 100. When the camera control operations described by the embodiments herein are implemented, a number of steps to activate the camera function or other functions on the terminal device 100 may be reduced, which can improve usability of the terminal device 100.

Obviously, numerous other modifications and variations of the present disclosure are possible in light of the above teachings. It is therefore to be understood that within the scope of the appended claims, the invention may be practiced otherwise than as specifically described herein. For example, advantageous results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable processing circuits configured to execute program code and/or computer instructions to execute the functions, processes and algorithms described herein. A processing circuit includes a programmed processor, as a processor includes circuitry. A processing circuit also includes devices such as an application specific integrated circuit (ASIC) and conventional circuit components arranged to perform the recited functions.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process. Additionally, some implementations may be performed on modules or hardware not identical to those described. Accordingly, other implementations are within the scope that may be claimed.

The above disclosure also encompasses the embodiments noted below.

(1) A device includes circuitry configured to acquire detection signals from at least one sensor device corresponding to an input operation; determine one or more input characters based on one or more characteristics of the detection signals; activate a timer corresponding to the one or more input characters; and issue a control signal to at least one camera to perform an image capture operation when an amount of remaining time on the timer is equal to zero.

(2) The device of (1), wherein the circuitry is further configured to acquire the detection signals from the at least one sensor device when the at least one camera is in use.

(3) The device of (1) or (2), wherein the at least one sensor device includes a touchscreen that detects one or more finger strokes drawn across a surface of the touchscreen.

(4) The device of any one of (1) to (3), wherein the circuitry is further configured to determine the one or more input characters based on at least one of a trajectory, shape, and direction of the one or more finger strokes.

(5) The device of any one of (1) to (4), wherein the circuitry is further configured to determine a number of touch operations that have been performed simultaneously on a touchscreen.

(6) The device of any one of (1) to (5), wherein the circuitry is further configured to perform a zoom function on the at least one camera when two or more touch operations are simultaneously detected.

(7) The device of any one of (1) to (6), wherein circuitry is further configured to determine the one or more input characters when the number of touch operations performed simultaneously on the touchscreen is equal to one; a plurality of touch-move events have occurred before a touch-up event; and the plurality of touch-move events are discrete.

(8) The device of any one of (1) to (7), wherein the circuitry is further configured to perform a camera touch focus operation when the number of touch operations performed simultaneously on the touchscreen is equal to one; and a plurality of touch-move events are distributed over a concentrated area.

(9) The device of any one of (1) to (8), wherein the circuitry is further configured to determine the one or more input characters drawn across a surface of a touchscreen within a predetermined circumscription rectangle.

(10) The device of any one of (1) to (9), wherein the circuitry is further configured to determine a double digit has been drawn on the touchscreen when at least one of a first digit is drawn on a left side of the circumscription rectangle and the first digit is a "1."

(11) The device of any one of (1) to (10), wherein the circuitry is further configured to wake the device from a sleep state and activate the timer when the one or more input characters are drawn on a surface of a touchscreen when the device is in the sleep state.

(12) The device of any one of (1) to (11), wherein the circuitry is further configured to output the amount of remaining time on the timer to a display.

(13) The device of any one of (1) to (12), wherein the at least one sensor device for acquiring the detection signals includes the at least one camera.

(14) The device of any one of (1) to (13), wherein the circuitry is further configured to determine the one or more input characters based gestures performed in one or more images acquired by the at least one camera.

(15) The device of any one of (1) to (14), wherein the circuitry is further configured to determine the one or more input characters based on a number of fingers extended on a hand in one or more images acquired by the at least one camera.

(16) The device of any one of (1) to (15), wherein the circuitry is further configured to wirelessly communicate with at least one external camera.

(17) The device of any one of (1) to (16), wherein the circuitry is further configured to issue the control signal to the at least one external camera to perform the image capture operation.

(18) The device of any one of (1) to (17), wherein the circuitry is further configured to cancel operation of the timer when a predetermined finger stroke on a surface of a touchscreen is detected.

(19) A method of controlling operation of a camera on a device, including: acquiring detection signals from at least one sensor device corresponding to an input operation; determining one or more input characters based on one or more characteristics of the detection signals; activating a timer corresponding to the one or more input characters; and issuing a control signal to at least one camera to perform an image capture operation when an amount of remaining time on the timer is equal to zero.

(20) A non-transitory computer readable medium having instructions stored therein that, when executed by one or more processors, cause the one or more processors to perform a method of controlling operation of a device, wherein the device includes a camera, the method including: acquiring detection signals from at least one sensor device corresponding to an input operation; determining one or more input characters based on one or more characteristics of the detection signals; activating a timer corresponding to the one or more input characters; and issuing a control signal to at least one camera to perform an image capture operation when an amount of remaining time on the timer is equal to zero.

The invention claimed is:

1. A device comprising:
    circuitry configured to
        acquire detection signals from at least one sensor device corresponding to an input operation;
        determine that the detection signals correspond to one or more input characters in a case that a number of touch operations performed simultaneously on a touchscreen is equal to one, a plurality of touch-move events are detected before a touch-up event and are discrete, and a plurality of strokes are not concentrated at one point on the sensor device;
        determine the one or more input characters based on one or more characteristics of the detection signals;
        activate a timer with an amount of remaining time that corresponds to the one or more input characters in response to detecting the plurality of touch-move events before the touch-up event that are discrete, and detecting that the plurality of strokes are not concentrated at one point on the sensor device; and
        issue a control signal to at least one camera to perform an image capture operation when the amount of remaining time on the timer is equal to zero.

2. The device of claim 1, wherein the circuitry is further configured to acquire the detection signals from the at least one sensor device when the at least one camera is in use.

3. The device of claim 1, wherein the at least one sensor device includes a touchscreen that detects one or more finger strokes drawn across a surface of the touchscreen.

4. The device of claim 3, wherein the circuitry is further configured to determine the one or more input characters based on at least one of a trajectory, shape, and direction of the one or more finger strokes.

5. The device of claim 1, wherein the circuitry is further configured to perform a zoom function on the at least one camera when two or more touch operations are simultaneously detected.

6. The device of claim 1, wherein the circuitry is further configured to perform a camera touch focus operation when the number of touch operations performed simultaneously on the touchscreen is equal to one; and a plurality of touch-move events are distributed over a concentrated area.

7. The device of claim 1, wherein the circuitry is further configured to determine the one or more input characters drawn across a surface of the touchscreen within a predetermined circumscription rectangle.

8. The device of claim 7, wherein the circuitry is further configured to determine a double digit has been drawn on the touchscreen when at least one of a first digit is drawn on a left side of the circumscription rectangle and the first digit is a "1".

9. The device of claim 1, wherein the circuitry is further configured to output the amount of remaining time on the timer to a display.

10. The device of claim 1, wherein the circuitry is further configured to determine the one or more input characters based on gestures performed in one or more images acquired by at least one camera.

11. The device of claim 1, wherein the circuitry is further configured to determine the one or more input characters based on a number of fingers extended on a hand in one or more images acquired by the at least one camera.

12. The device of claim 1, wherein the circuitry is further configured to wirelessly communicate with at least one external camera.

13. The device of claim 12, wherein the circuitry is further configured to issue the control signal to the at least one external camera to perform the image capture operation.

14. The device of claim 1, wherein the circuitry is further configured to cancel operation of the timer when a predetermined finger stroke on a surface of the touchscreen is detected.

15. A method of controlling operation of a camera on a device, comprising:
acquiring detection signals from at least one sensor device corresponding to an input operation;
determining that the detection signals correspond to one or more input characters in a case that a number of touch operations performed simultaneously on a touchscreen is equal to one, a plurality of touch-move events are detected before a touch-up event and are discrete, and a plurality of strokes are not concentrated at one point on the sensor device;
determining the one or more input characters based on one or more characteristics of the detection signals;
activating a timer with an amount of remaining time that corresponds to the one or more input characters in response to detecting the plurality of touch-move events before the touch-up event that are discrete, and detecting that the plurality of strokes are not concentrated at one point on the sensor device; and
issuing a control signal to at least one camera to perform an image capture operation when the amount of remaining time on the timer is equal to zero.

16. A non-transitory computer readable medium having instructions stored therein that, when executed by one or more processors, cause the one or more processors to perform a method of controlling operation of a device, wherein the device includes a camera, the method comprising:
acquiring detection signals from at least one sensor device corresponding to an input operation;
determining that the detection signals correspond to one or more input characters in a case that a number of touch operations performed simultaneously on a touchscreen is equal to one, a plurality of touch-move events are detected before a touch-up event and are discrete, and a plurality of strokes are not concentrated at one point on the sensor device;
determining the one or more input characters based on one or more characteristics of the detection signals;
activating a timer with an amount of remaining time that corresponds to the one or more input characters in response to detecting the plurality of touch-move events before the touch-up event that are discrete, and detecting that the plurality of strokes are not concentrated at one point on the sensor device; and
issuing a control signal to at least one camera to perform an image capture operation when the amount of remaining time on the timer is equal to zero.

17. The device of claim 1, wherein the one or more input characters is a number.

18. The device of claim 17, wherein the number corresponds to an initial value of the amount of remaining time of the timer.

* * * * *